United States Patent
Müller (10) Patent No.: US 11,505,087 B2
(45) Date of Patent: Nov. 22, 2022

(54) AIRCRAFT

(71) Applicant: Dr. Ing. h.c. F. Porsche Aktiengesellschaft, Stuttgart (DE)

(72) Inventor: Michael Müller, Bietigheim-Bissingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 593 days.

(21) Appl. No.: 16/460,456

(22) Filed: Jul. 2, 2019

(65) Prior Publication Data

US 2020/0009989 A1     Jan. 9, 2020

(30) Foreign Application Priority Data

Jul. 4, 2018    (DE) .......................... 102018116169.7

(51) Int. Cl.
| | |
|---|---|
| *B60L 58/18* | (2019.01) |
| *B64C 29/00* | (2006.01) |
| *B64C 39/02* | (2006.01) |
| *B64D 27/24* | (2006.01) |
| *B60L 53/00* | (2019.01) |
| *B64C 3/54* | (2006.01) |

(52) U.S. Cl.
CPC .............. *B60L 58/18* (2019.02); *B60L 53/00* (2019.02); *B64C 3/546* (2013.01); *B64C 29/0025* (2013.01); *B64C 39/024* (2013.01); *B64D 27/24* (2013.01); *B60L 2200/10* (2013.01); *B64C 2201/042* (2013.01)

(58) Field of Classification Search
CPC .......... B60L 58/18; B60L 58/22; B60L 53/00; B60L 2200/10; B64C 2201/042; B64D 2221/00
See application file for complete search history.

(56) References Cited

U.S. PATENT DOCUMENTS

| | | | |
|---|---|---|---|
| 3,113,747 A | | 12/1963 | Smith |
| 3,933,325 A | * | 1/1976 | Kaelin ................. B64C 39/001 244/23 C |
| 5,848,660 A | | 12/1998 | McGreen |
| 7,772,799 B2 | * | 8/2010 | Wu .................... H01M 10/6556 320/106 |
| 9,162,770 B2 | | 10/2015 | Stückl et al. |
| 9,786,961 B2 | | 10/2017 | Dyer et al. |
| 10,150,524 B2 | * | 12/2018 | Evans .................... B62D 27/06 |
| 10,183,741 B2 | * | 1/2019 | Roeseler ............... B64C 27/001 |
| 10,207,805 B2 | * | 2/2019 | Evans ..................... B64D 1/12 |
| 10,340,709 B2 | * | 7/2019 | Dyer ....................... B60L 53/31 |

(Continued)

FOREIGN PATENT DOCUMENTS

| | | |
|---|---|---|
| CN | 1288843 A | 3/2001 |
| CN | 1772561 A | 5/2006 |

(Continued)

OTHER PUBLICATIONS

Great Britain Combined Search and Examination Report for Great Britain Application No. 1909481.2, dated Dec. 5, 2019, 4 pages.

*Primary Examiner* — Christopher P Ellis
(74) *Attorney, Agent, or Firm* — RatnerPrestia (57) ABSTRACT

An aircraft includes a first battery, provisions for transport that are powered by a second battery, and a management system for transferring energy between the first battery and the second battery.

5 Claims, 6 Drawing Sheets

(56) References Cited

U.S. PATENT DOCUMENTS

| | | | |
|---|---|---|---|
| 10,532,815 B1* | 1/2020 | Thrun | H01M 50/249 |
| 10,882,413 B2* | 1/2021 | Ferran | B60L 53/62 |
| 11,025,074 B2* | 6/2021 | Masuda | H02J 7/0031 |
| 11,117,667 B1* | 9/2021 | McGann | B64C 7/00 |
| 2001/0049054 A1* | 12/2001 | Enomoto | H01M 50/566 |
| | | | 429/177 |
| 2009/0239130 A1* | 9/2009 | Culver | H01M 10/0585 |
| | | | 429/50 |
| 2009/0246596 A1* | 10/2009 | Sridhar | H01M 16/006 |
| | | | 429/513 |
| 2010/0102625 A1* | 4/2010 | Karimi | H02J 4/00 |
| | | | 307/9.1 |
| 2012/0088131 A1* | 4/2012 | Chung | H01M 10/613 |
| | | | 429/72 |
| 2012/0135634 A1* | 5/2012 | Gaul | B60L 53/65 |
| | | | 439/488 |
| 2013/0037650 A1 | 2/2013 | Heppe | |
| 2015/0115096 A1 | 4/2015 | Rossi | |
| 2016/0031564 A1 | 2/2016 | Yates | |
| 2017/0141589 A1* | 5/2017 | Inoue | H02J 7/00 |
| 2018/0089611 A1 | 3/2018 | Burch et al. | |
| 2018/0252774 A1* | 9/2018 | Ciaccio | H02J 7/0048 |
| 2018/0327113 A1* | 11/2018 | von Flotow | F15B 1/26 |
| 2019/0100312 A1* | 4/2019 | Fen | B64D 5/00 |
| 2019/0152605 A1* | 5/2019 | Tillotson | G05D 1/101 |
| 2019/0241274 A1* | 8/2019 | Hunkel | H02J 7/345 |
| 2019/0252655 A1* | 8/2019 | Zimmermann | B64D 27/24 |
| 2019/0315479 A1* | 10/2019 | Tillotson | G01S 5/0072 |
| 2019/0382112 A1* | 12/2019 | Muldoon | B64D 27/24 |
| 2020/0168105 A1* | 5/2020 | Zosel | G06Q 50/30 |
| 2020/0277080 A1* | 9/2020 | Wiegman | B64D 47/00 |
| 2020/0331601 A1* | 10/2020 | Sabie | B64C 27/20 |
| 2021/0331602 A1* | 10/2021 | Kim | B60L 50/62 |
| 2021/0339881 A1* | 11/2021 | Bevirt | B60L 58/18 |
| 2021/0391727 A1* | 12/2021 | Devautour | B64D 45/00 |

FOREIGN PATENT DOCUMENTS

| | | | | |
|---|---|---|---|---|
| CN | 110217373 A | * | 9/2019 | B64B 1/00 |
| CN | 110341948 A | * | 10/2019 | |
| CN | 114056572 A | * | 2/2022 | |
| DE | 10252292 A1 | | 6/2004 | |
| DE | 102010003760 A1 | | 10/2011 | |
| DE | 102011105880 A1 | | 12/2012 | |
| DE | 112012003115 T5 | | 8/2014 | |
| DE | 202015003815 U1 | | 7/2015 | |
| DE | 202015007089 U1 | | 11/2015 | |
| DE | 202018000856 U1 | | 3/2018 | |
| DE | 102018002229 A1 | | 8/2018 | |
| EP | 1174976 A1 | | 1/2002 | |
| EP | 3044846 B1 | * | 10/2019 | B64D 41/00 |
| GB | 2555400 A | | 5/2018 | |
| RU | 2681966 C1 | * | 3/2019 | |
| WO | 2018013069 A1 | | 1/2018 | |
| WO | 2018026754 A1 | | 2/2018 | |
| WO | 2018087213 A1 | | 5/2018 | |
| WO | WO-2018229747 A1 | * | 12/2018 | B60L 53/80 |

* cited by examiner

AIRCRAFT

CROSS-REFERENCE TO RELATED APPLICATION

This application claims priority to German Patent Application No. 10 2018 116 169.7, filed Jul. 4, 2018, the content of such application being incorporated by reference herein in its entirety.

FIELD OF THE INVENTION

The present invention relates to an aircraft, in particular a fully electric vertical take-off and landing (VTOL) aircraft.

BACKGROUND OF THE INVENTION

VTOL is the cross-language name given in the aerospace industry to any type of aircraft, drone or rocket that has the capability of lifting off and landing substantially vertically and without a runway. This collective term is used below in a broad sense that includes not just fixed-wing aircraft with wings, but rather also rotary-wing aircraft such as helicopters, gyrocopters, gyrodynes and hybrids such as composite or combination helicopters and convertiplanes. Short take-off and landing (STOL) aircraft, short take-off and vertical landing (STOVL) aircraft and vertical take-off and horizontal landing (VTHL) aircraft are also included.

CN1288843A, which is incorporated by reference herein, discloses an escape capsule without a dedicated energy storage element for vertical take-off aircraft.

An escape capsule for VTOL with parachutes is described in CN1772561A, which is incorporated by reference herein (see FIG. 11 on page 14).

U.S. Pat. No. 3,113,747A, which is incorporated by reference herein, relates to a combination of VTOL aircraft and tugs with an independent landing capability, the latter however not offering any transport capability for passengers.

DE102010003760A1, which is incorporated by reference herein, relates to a method for the range management of a vehicle having an electromotive drive based on an energy consumption model, the available amount of energy and a road database.

DE10252292A1, which is incorporated by reference herein, specifies a method for controlling the energy distribution in a means of transport, having the steps: establishing value-amount functions for energy sources, establishing value-amount functions for energy sinks, transmitting the value-amount function of the energy sources and of the energy sinks to a calculation device, calculating a current value from the value-amount functions and transmitting the current value to the energy sinks and sources. The value-amount function in relation to an energy sink specifies the extent of the consumption of a particular power, whereas the value-amount function in relation to an energy source specifies the extent of a defined readiness to output a particular power, and wherein the calculated value is a measure of the supply and demand for power within the means of transport, taking into account the readiness to output and the importance of consuming power.

SUMMARY OF THE INVENTION

Described herein is an aircraft, in particular a fully electric vertical take-off and landing aircraft.

Benefits of this solution lie in the increased individual range of an aircraft according to aspects of the invention and in the mobility that is integrated for the benefit of the client. The approach according to aspects of the invention is in this case able to be transferred to essentially any integrated transport system that comprises a main transport system having one or more associated subsystems or additional systems, and allows an efficient distribution of energy to various transport means over an overall distance here.

The aircraft may thus be equipped for instance with bent or even selectively bendable wings. A corresponding variant increases the effective wing surface in horizontal flight, without however increasing the footprint of the aircraft.

The aircraft may furthermore have a fast-charging battery system that provides the drive energy for vertical take-off and landing and horizontal flight and allows quick charging of the aircraft when stationary.

In this case, instead of free-moving rotors, a plurality of ducted fans, including of different sizes, may be used to drive the aircraft, as are known outside of the aerospace industry, for instance for hovercraft or fanboats. The cylindrical housing surrounding the fan may considerably reduce thrust losses caused by vortexes at the blade tips in such an embodiment. Suitable ducted fans may be aligned horizontally or vertically, designed so as to pivot between both positions or be covered by louvers during horizontal flight for aerodynamic reasons. Pure horizontal thrust generation using fixed ducted fans is additionally conceivable.

Finally, in addition to preferably fully autonomous operation of the aircraft, it is also possible to consider granting manual control to human pilots if they are sufficiently qualified, which gives the device according to aspects of the invention the greatest possible flexibility in terms of handling.

BRIEF DESCRIPTION OF THE DRAWING

One exemplary embodiment of the invention is illustrated in the drawing and is described in more detail below.

DETAILED DESCRIPTION OF THE INVENTION

The terms 'fan,' 'rotor' and 'propeller' may be used interchangeably herein.

Figure 1:
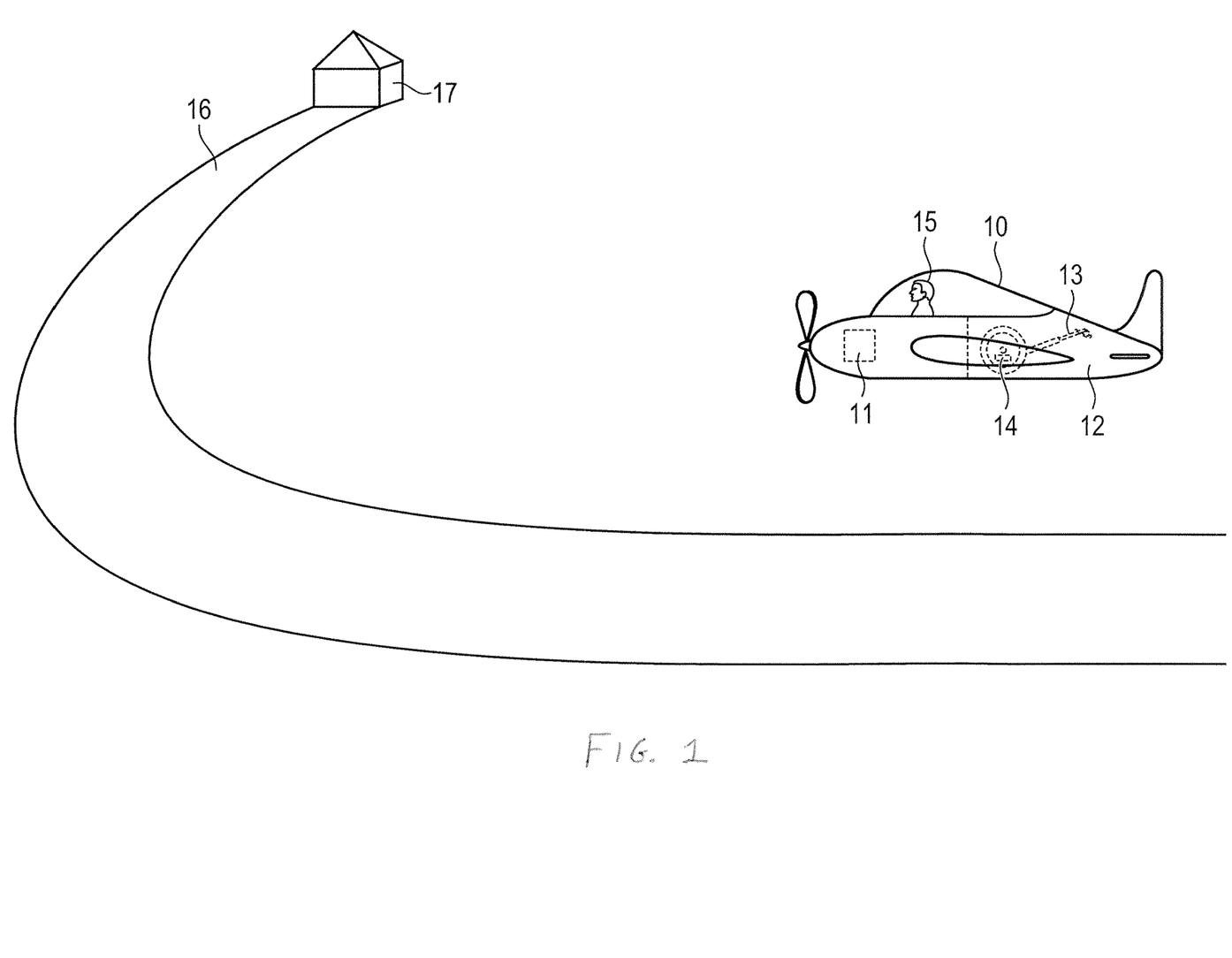
FIG. 1 shows an aircraft according to one configuration of the invention.

FIG. 1 illustrates the structural features of one preferred configuration of the aircraft 10 according to aspects of the invention.

As is easily able to be seen from the drawing, an installation space 12 is present in the VTOL aircraft 10 for the space-saving accommodation of at least one single-person transport means 13 suitable for short distances. An electrical/electronic interface is integrated in this case. A main transport system and a second auxiliary transport system are thereby created, by way of which a user reaches his destination. The two systems form a virtual unit that is coordinated by a computer-assisted system.

If a user wishes for example to cover a known distance using this electric means of transport 10, then a particular amount of energy is necessary for this purpose. To this end, an energy management system determines the respective amount of energy that is necessary for various means of transport for the respective range. The respective means of transport are charged with this amount of energy, or the energy may be distributed during operation. With knowledge of the overall range, said energy or range management system to this end distributes the greater share of the energy to that system 10, 13 that manages the main share of the distance, and the lesser share to the respective other system 13, 10, on the other hand.

It is thereby possible to "shift" energy, as it were, between the primary aircraft 10 and subordinate means of transport 13 according to need, for example depending on the range of both vehicles. In particular in an emergency, the VTOL aircraft 10 may draw additional energy from the accumulator of the short-distance means of transport 13.

The user 15 is thereby able to arrive close to his intended location 17 using the VTOL aircraft 10 and cover the remaining distance 16 using the further means of transport 13. Even autonomous navigation over this figurative "last mile" is conceivable without departing from the scope of the invention.

Figure 2:
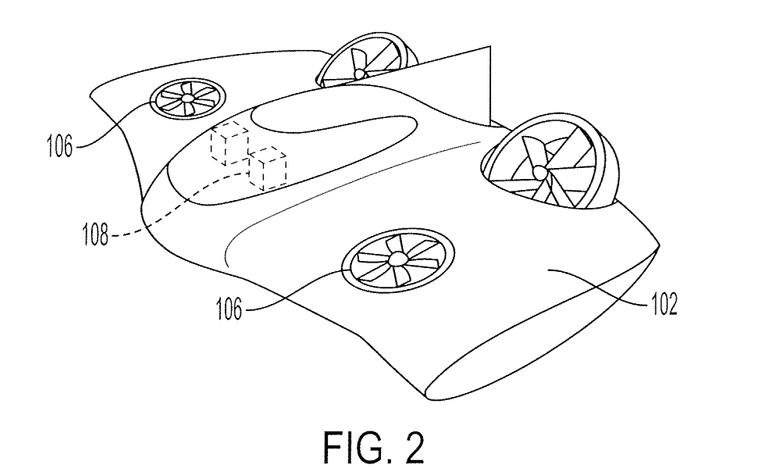
FIG. 2 depicts an isometric view of an aircraft, wherein the wings are shown in an extended configuration and the rear propellers are shown in an angled orientation.
Figure 3:
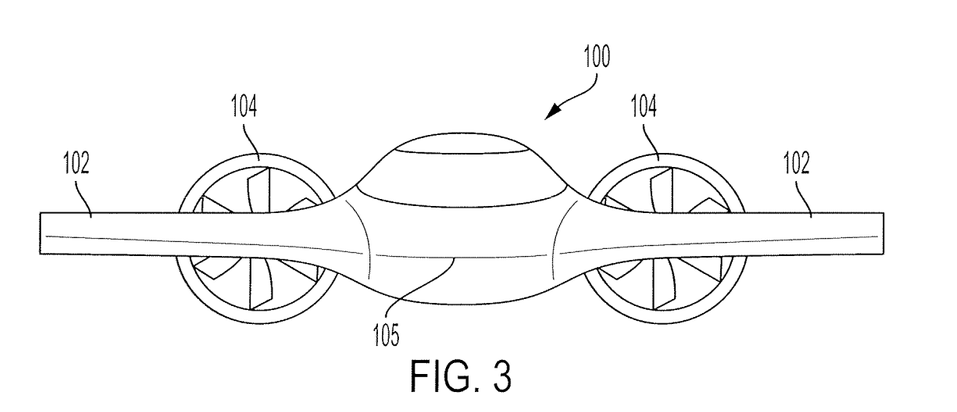
FIG. 3 depicts a front elevation view of the aircraft of FIG. 2, wherein the wings are shown extended configuration and the rear propellers are shown in a cruising orientation.
Figure 4:
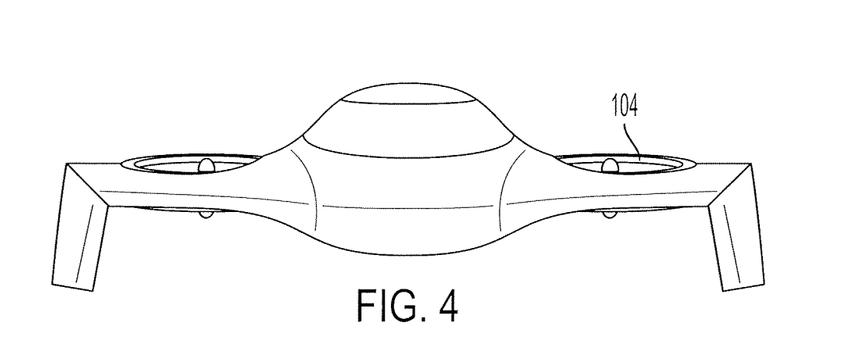
FIG. 4 depicts another front elevation view of the aircraft, wherein the wings are shown in a folded configuration and the rear propellers are shown in a take-off/landing orientation.

FIGS. 2-4 depict an aircraft 100. The aircraft 100 shown in those figures may appear different from the previously described aircraft, however, most (if not all) of the details of the previously described aircraft also apply to aircraft 100.

The aircraft 100 includes foldable wings 102. The wings 102 are shown in a folded configuration in FIG. 4 and an extended configuration in FIG. 3. A motor or solenoid is configured to move the wings between those configurations.

Rear propellers 104 are mounted on the trailing edge of the airfoils or wings 102 (i.e., the edge furthest from the nose 105). Propellers 104 may be referred to as cruising propellers because they are used during the cruising operation of the aircraft (at least in one position of the propellers 104). The propellers 104 are configured to pivot between two different positions, as shown in FIGS. 2-4. In the vertical position of the propellers 104 shown in FIG. 3, the propellers 104 generate maximum horizontal thrust for cruising operation of the aircraft (i.e., while the aircraft is flying through the air). In the horizontal position of the propellers 104 shown in FIG. 4, the propellers 104 generate maximum vertical thrust for take-off and landing operations of the aircraft. A motor or solenoid is configured to move the propellers 104 between those two positions. Alternatively, the propellers 104 may be immovable and fixed in a vertical position, as shown in FIG. 2.

Horizontally mounted propellers 106 are fixedly mounted and integrated into the wings 102. Unlike the propellers 104, the position of the propellers 106 is fixed, however, those skilled in the art will recognize that the propellers 106 could be modified so that they are pivotable between vertical and horizontal positions. The propellers 106 generate maximum vertical thrust for take-off and landing operations of the aircraft. The propellers 106 may also be referred to herein as lifting propellers.

The propellers 104 and 106, which may also be referred to herein as fans, may be operated by a fully-electric drive. To that end, a battery charging system 108 including a charger, an inverter and a fast-charging battery are positioned within the fuselage of the aircraft for powering the propellers 104 and 106. The fuselage may also be configured to carry one or more passengers.

Figure 5:
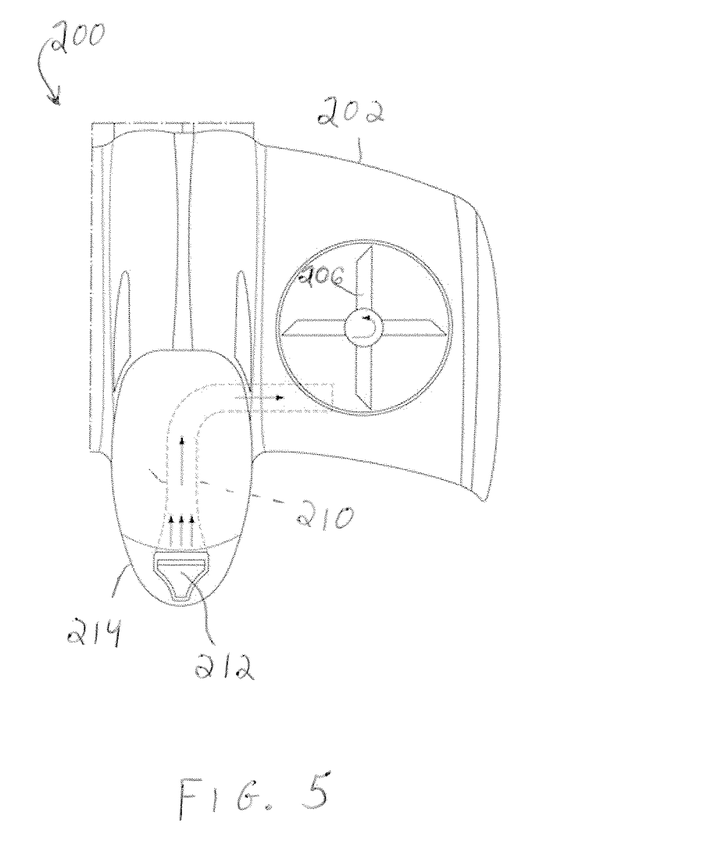
FIG. 5 depicts a top plan view of a portion of an aircraft, showing an internal duct extending between a nose of the aircraft and a horizontal fan mounted to the wing.
Figure 6:
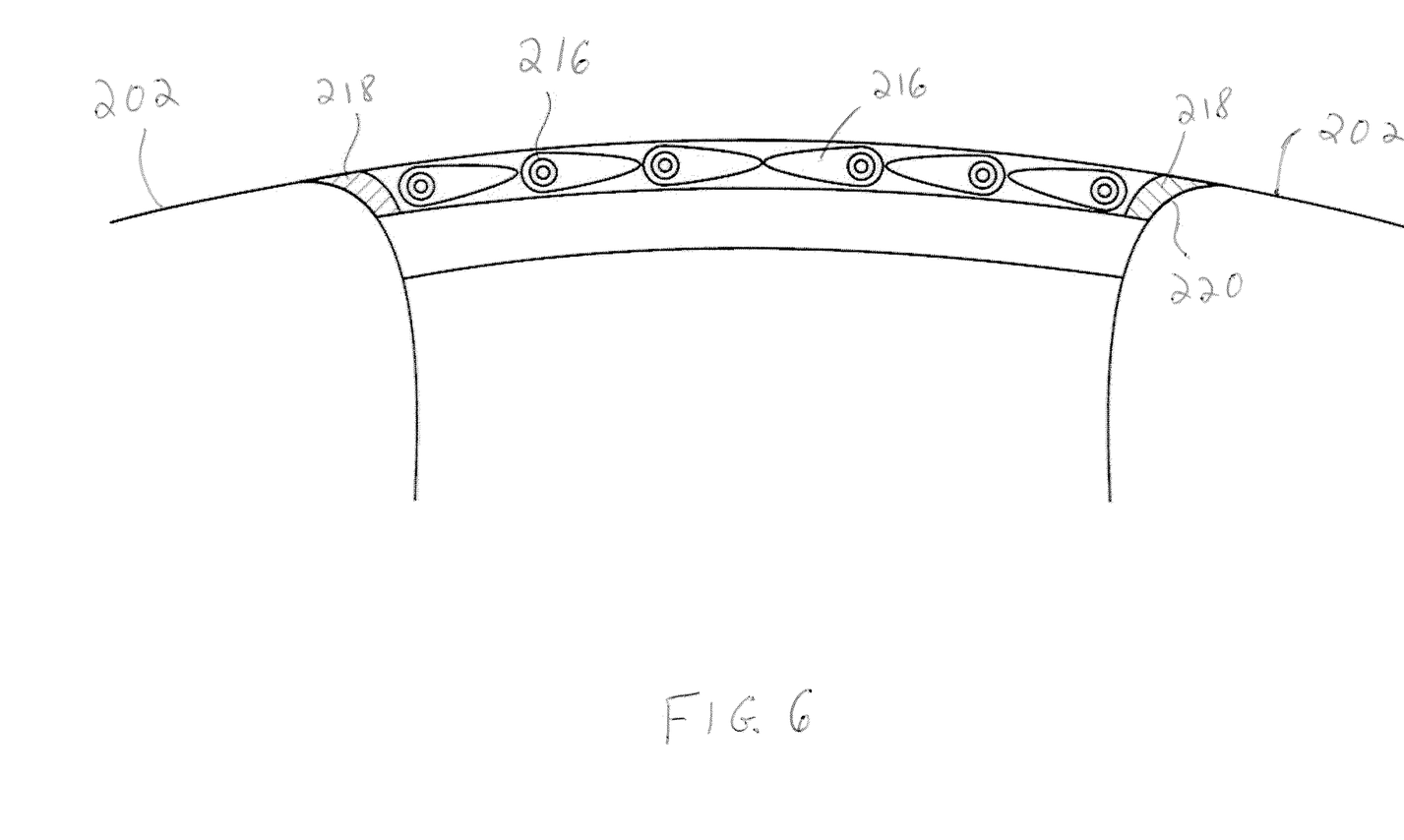
FIG. 6 depicts moveable louvers applied on top of the horizontal fan of FIG. 5, wherein the louvers are shown in a closed position.
Figure 7:
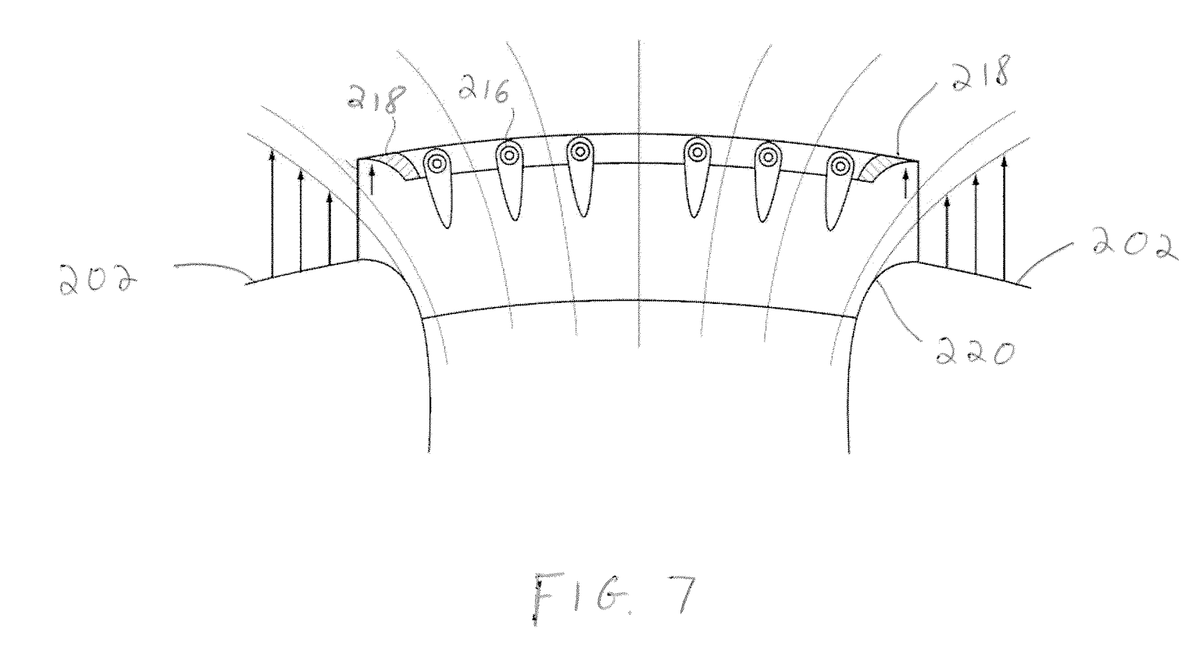
FIG. 7 depicts the movable louvers of FIG. 6, wherein the louvers are shown in an open position.
Figure 8:
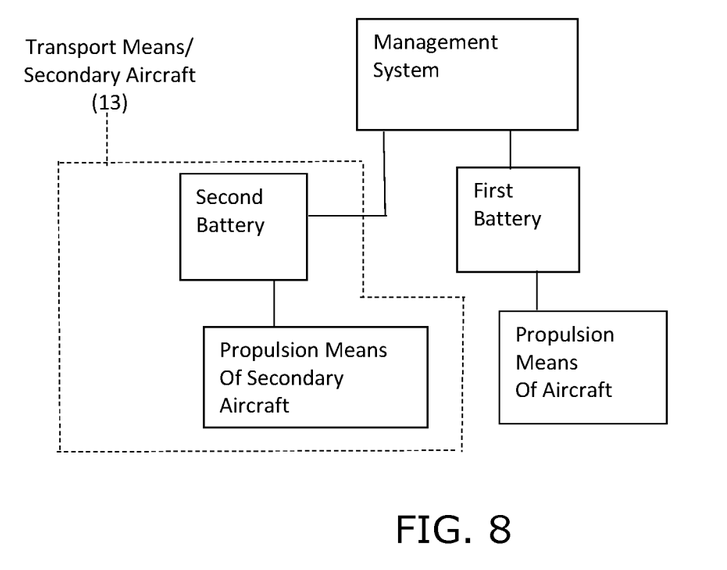
FIG. 8 depicts a schematic of the energy management system.

FIGS. 5-7 depict views of an aircraft 200. The aircraft 200 shown in those figures may appear different from the previously described aircraft 100, however, most (if not all) of the details of the previously described aircraft 100 also apply to aircraft 200. Only a segment of the aircraft 200 is shown in FIG. 5. An air duct 210 extends between an opening 212 formed on the nose 214 of the aircraft 200 and the horizontally mounted propeller 206 that is fixedly mounted to the wing 202. In operation, air is delivered to the propeller 206 via the duct 210, as depicts by the arrows. Although not shown, air ducts that are similar to duct 210, may extend to the propeller 206 on the opposite wing 202, as well as any rear propellers 104 (not shown in these views). Accordingly, the propellers may be referred to as either "ducted propellers" or "ducted fans."

FIGS. 6 and 7 depict louvers 216 that are configured to selectively cover the horizontally mounted propellers 206. It is noted that the louvers 216 are omitted from FIG. 5 for clarity purposes. Each louver 216 is rotatable about a shaft (or otherwise moveable) between a closed position (FIG. 6) and an open position (FIG. 7). The louvers 216, which are flush with the top face of the wing 202, may be moved to the closed position during the cruising operation of the aircraft 200 for aerodynamic purposes. The louvers 216 may be moved to an open position at any time during operation of the propellers 206 to permit the exit or entrance of air therethrough. A motor or solenoid is configured to move the louvers 216 between those positions. It is noted that the louvers are shown in a closed position in FIG. 2.

A sealing ring 218 surrounds the louvers 216 and is moveable between a retracted position (FIG. 6) and a deployed position (FIG. 7). The louvers 216 are mounted to the sealing ring 218 and move therewith between the retracted and deployed positions. The lower surface of the sealing ring 218 is configured to be in sealing relationship with an opening 220 formed in the wing 202. It should be understood that the opening 220 accommodates the body of the propeller 206. The sealing ring 218 may be moved to the retracted position, which is flush with the top face of the wing 202, during cruising operation of the aircraft 200 for aerodynamic purposes. Alternatively, the sealing ring 218 may be moved to the deployed (i.e., extended) position at any time during operation of the propellers 206 to permit the exit or entrance of air, as depicted by the arrows in FIG. 7. A motor or solenoid is configured to move the sealing ring 218 between those positions.

What is claimed is:

1. An aircraft comprising:
a first battery,
a propulsion system of the aircraft that is powered by the first battery;
at least one means of transport in the form of a secondary aircraft that is stored within the aircraft, the secondary aircraft having a second battery; and a management system for transferring energy to the first battery of the aircraft and the second battery of the secondary aircraft, wherein, on the way to a predefined destination, the management system is configured to transfer a proportion of the energy to the first battery and the second battery as a function of a remaining distance to the predefined destination for the aircraft and the secondary aircraft, respectively.

2. The aircraft as claimed in claim 1, further comprising an electrical or electronic connection between the first battery and the second battery.

3. The aircraft as claimed in claim 1, wherein the aircraft has a fully electric drive.

4. The aircraft as claimed in claim 1, wherein the aircraft comprises a fast-charging battery system.

5. The aircraft as claimed in claim 1 further comprising a propulsion means of the secondary aircraft powered by the second battery.

* * * * *